United States Patent

Garner

[15] 3,673,543

[45] June 27, 1972

[54] MICRO-CIRCUIT PACK RECEPTACLE

[72] Inventor: Peter Garner, Fanwood, N.J.

[73] Assignee: Thomas & Betts Corporation, Elizabeth, N.J.

[22] Filed: April 27, 1970

[21] Appl. No.: 31,958

[52] U.S. Cl.........................339/61 M, 339/17 CF, 339/174, 206/65 F, 174/138 G

[51] Int. Cl.........................................................H01r 13/50

[58] Field of Search...................339/17 C, 17 CF, 61, 66, 74, 339/176 M, 191 M, 192, 193, 205, 174, 221; 317/101 A, 101 C, 101 CC; 174/DIG. 3, 138 G; 206/65 F

[56] References Cited

UNITED STATES PATENTS 3,440,596 4/1969 Frompovicz.......................339/206 R

*Primary Examiner*—Richard E. Moore
*Assistant Examiner*—Lawrence J. Staab
*Attorney*—Thomas M. Marshall

[57] ABSTRACT

The receptacle of the invention comprises a body having a plurality of apertures adapted to accommodate the leads of a micro-circuit pack and the corresponding pins secured to a wire wrap panel, and disposed in each aperture is a spring means for maintaining a frictional and electrical contact between each leg of the micro-circuit pack and the respective upstanding pin secured to the wire wrap panel.

5 Claims, 9 Drawing Figures

INVENTOR.
PETER GARNER
BY
Thomas W. Marshall
ATTORNEY

INVENTOR.
PETER GARNER

BY

Thomas M. Marshall
ATTORNEY

INVENTOR.
PETER GARNER

BY

Thomas M Marshall
ATTORNEY

INVENTOR.
PETER GARNER
BY
Thomas M. Marshall
ATTORNEY

MICRO-CIRCUIT PACK RECEPTACLE

With the advent of sophisticated electronics and in particular the development of high speed computers, the necessity for miniaturization of the numerous circuits required in the system becomes more acute. As part of this development, the industry has adopted the use of micro-circuit packs, also known as integrated circuit packs, which include sophisticated electronics in miniaturized scale embodying a small component having a plurality of leads, either 14 or 16 extending therefrom. The present technique for mounting these integrated circuit packs calls for mounting a plurality of packs on a panel and electrically connecting the legs of the packs through the intermediary of sockets or pins to leads extending from the opposite side of the panel. In turn, wires may be wrapped around these leads for connection to other systems in the computer.

One prior technique for mounting integrated circuit packs requires the use of a socket for each integrated circuit pack. Each socket includes leads which are positioned through holes in the panel for connection, e.g., by wire wrapping. Accordingly, each socket must be accurately located and fixedly mounted to a printed circuit board. In turn, each integrated circuit pack is placed in the socket by spring pressure. Because of the composite structure of the socket and the leads, the socket receptacle is expensive.

Another prior technique employs individual socket terminals or pins which are designed so that one end is a socket for receiving one of the leads of an integrated circuit pack, while the opposite end is suitable for connection, e.g., by wire wrapping, to other leads in the computer circuit. The individual socket terminals are initially mounted in the wire wrap panel by being forced through holes in the panel. After the required number of pins are assembled in the panel, the leads of the integrated circuit pack may be respectively inserted into the socket ends of the socket terminals. As in the case of the "socket" technique, the use of socket terminals is expensive and the reliability is limited by the quality of the frictional contact between the lead and the spring contact in the socket terminal. Furthermore, because standard dual-in-line integrated circuit packs have 14 or 16 leads, the use of individual socket terminals may cause alignment problems, thereby resulting in bent leads of the integrated circuit pack.

Accordingly, the object of this invention is to provide improved socket receptacles for mounting a plurality of micro-circuit packs to a wire wrap panel.

It is a further object of this invention to provide a socket which is economical and produces high reliable connections.

Another object of this invention is to provide sockets which may be readily replaced for repair purposes.

Briefly, the subject invention provides a receptacle for connecting a plurality of integrated circuit packs to a circuit panel. The receptacle comprises a generally U-shaped body having a plurality of apertures extending through the leg portions of the U-shaped body, with spring leads mounted in each aperture. In order to mount an integrated circuit pack to a wire wrap panel having a plurality of pins already mounted therein, the receptacle is first placed over the wire wrap panel pins whereby each aperture accommodates one pin. In turn, the legs of the integrated circuit pack are inserted into the respective openings of the receptacle, whereby each leg is in the immediate vicinity of an upstanding pin, and the spring lead disposed in the body causes said leg and pin to be forced into frictional and electrical connection. Additionally, the spring lead functions to maintain the assembly in mechanical connection by frictional contact.

These and other objects of the invention may be more readily appreciated by reference to the following description, taken in conjunction with the following figures and appended claims:

Figures 1, 2:
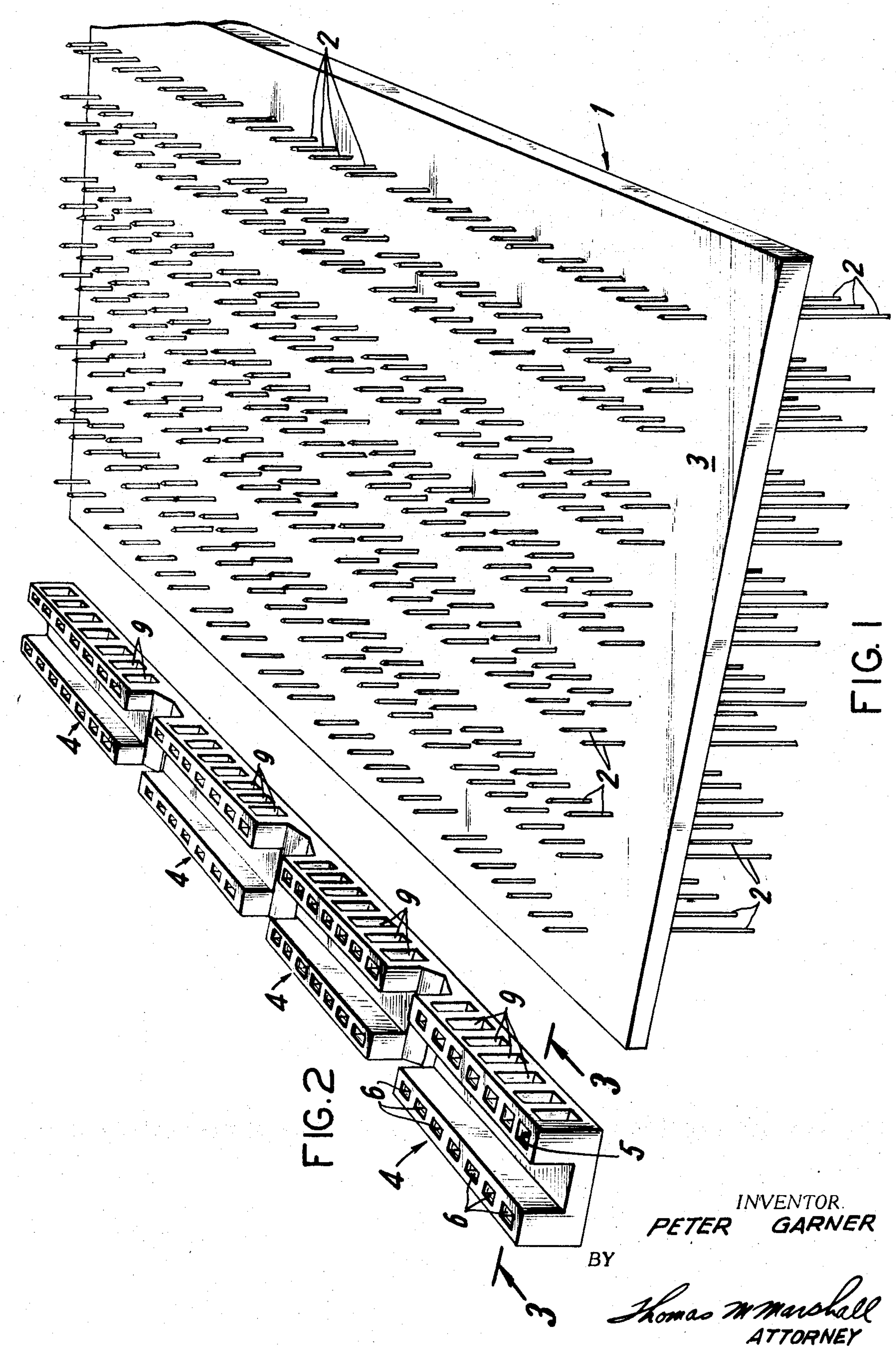
FIG. 1 is a perspective view of a wire wrap panel having the upstanding pins already mounted therein.
FIG. 2 is a perspective view of a plurality of the receptacles of the present invention.

FIG. 1 illustrates a wire wrap panel 1 having a plurality of upstanding pins 2 extending therethrough. Each pin 2 may be 0.025 inches square and may be force-fit into the panel, or may be molded therewith or otherwise formed therewith. The panel may be made of a glass epoxy board, or an aluminum board. The pins extending from the upper side 3 of the panel are adapted to connect to the integrated circuit packs, while on the lower side of the panel the pins 2 extend a suitable length in order to enable wire-wrapping of other leads extending from other leads in the electrical device.

FIG. 2 illustrates a plurality of the receptacles 4 of the present invention, which receptacles may be made of a molded plastic whereby a plurality of receptacles may be formed in one operation and interconnected by a suitable carrier strip, as is well known in the art of plastic molding. Each receptacle 4 comprises a body member generally U-shaped in configuration, and having a plurality of apertures 5 extending along the axial length of each leg of the U-shaped body member.

Figures 3, 4, 5:
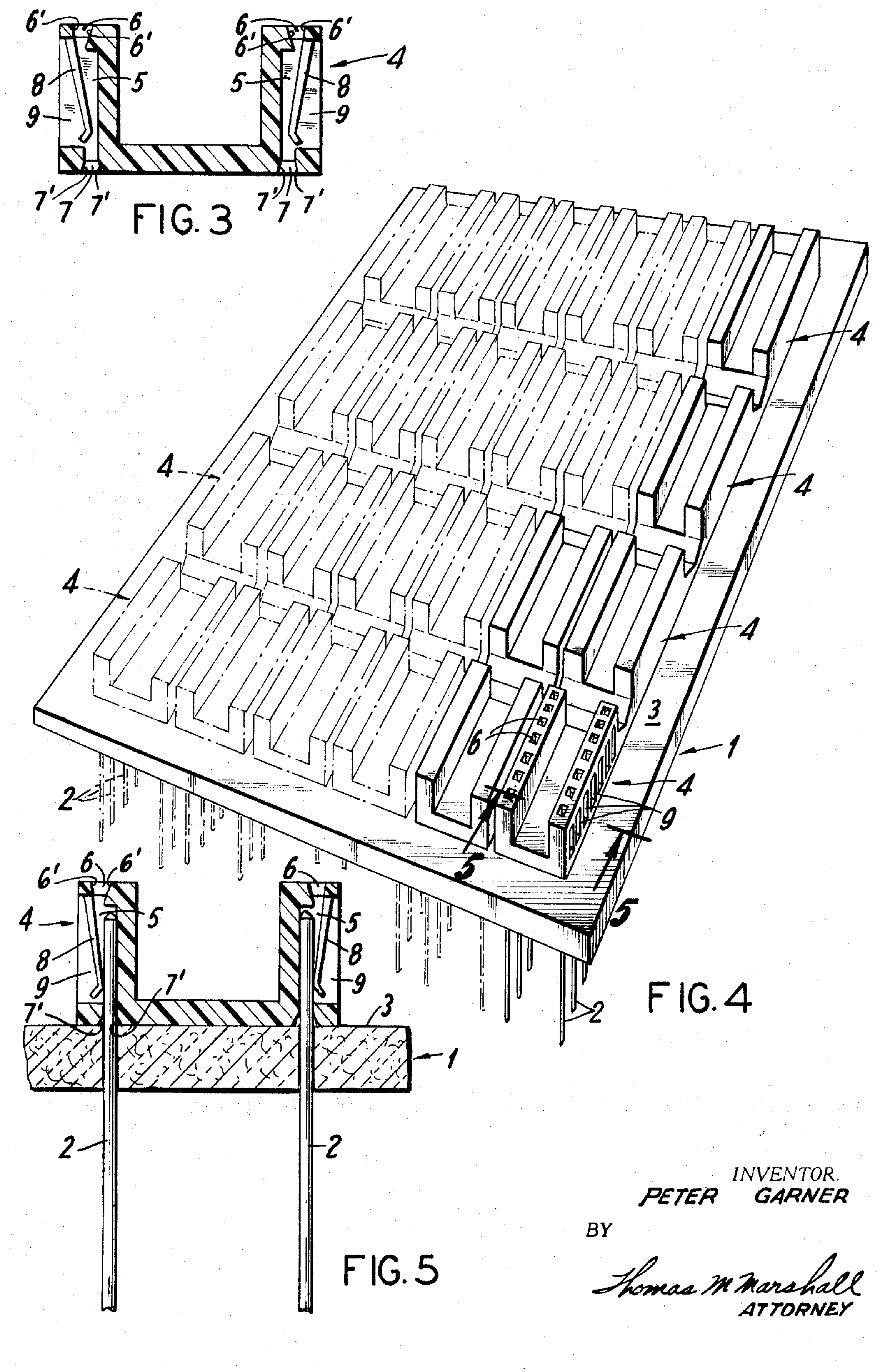
FIG. 3 is a cross section taken along lines 3—3 of FIG. 2.
FIG. 4 is a perspective view of a plurality of receptacles of the subject invention mounted on the corresponding upstanding pins of a wire wrap panel.
FIG. 5 is a cross-sectional view taken along lines 5—5 of FIG. 4.

FIG. 3 illustrates a cross section, wherein each aperture 5 is shown as including an upper opening 6 which is tapered by means of side walls 6', 6', and a lower opening 7 also including tapered walls 7', 7'. The taper of the upper and lower holes 6 and 7 is such as to guide the pins which are to be inserted therethrough into an interference path, as will be more fully described. Also disposed in the aperture extending between the upper and lower portions of each leg is a spring means, illustrated in FIG. 3 as a depending finger 8 which may be formed of plastic and molded integral with the body member. As illustrated in FIG. 3, in its "at rest" position the spring finger 8 effectively blocks the path of a line extending between the upper and lower apertures, for purposes to be described hereinafter. The receptacle is also formed with side openings 9 along each leg portion (see FIG. 2) in the vicinity of each aperture 5. Openings 9, along with the central portion of the U-shaped body thereby provide the desirable characteristics of air circulation which facilitates the dissipation of heat generated by the interconnection of the legs of a micro-circuit pack and the corresponding upstanding pins of the wire-wrap panel.

Turning to FIGS. 4 and 5, the first step in the assembly of micro-circuit packs is the mounting of the receptacles of the subject invention on to a wire wrap panel of the type illustrated in FIG. 1. When the receptacle is fully seated on the panel, the upstanding pins 2 extend through the lower tapered openings of a receptacle 4. Each pin extends for a distance less than the total height of the receptacle to a point immediately below the overhand of the tapered side 6' of the upper opening 6 of the aperture. In this position, the flexible spring leads are partially displaced.

Figures 6, 7:
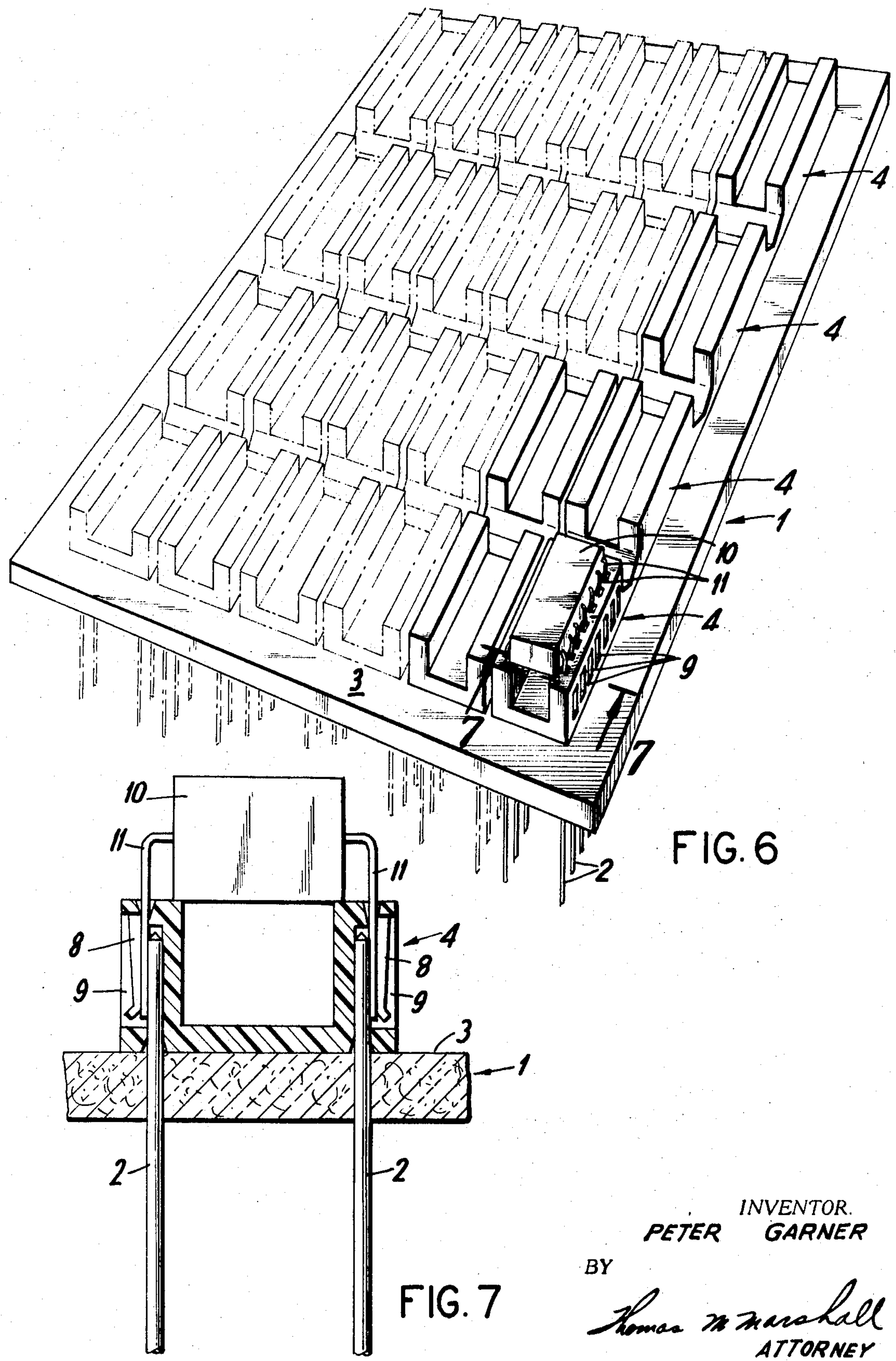
FIG. 6 illustrates the assembly of an integrated circuit pack to a wire wrap panel employing the receptacle of the subject invention.
FIG. 7 illustrates a cross-sectional view taken along lines 7—7 of FIG. 6.

FIGS. 6 and 7 illustrate the final assembly of the mounting of an integrated circuit pack 10, that is, the positioning of a pack into the corresponding apertures in the upper portion of a receptacle of the subject invention. As shown in FIG. 7, the spring biases the leg 11 of the pack 10 against the upstanding pin 2 thereby establishing a mechanical frictional connection and an electrical connection between the integrated circuit pack and the wire wrap pin. Subsequently, the opposite ends of the wire wrap pins will be suitably connected, as by wire wrapping, to leads extending to other components in the circuitry.

It is readily appreciated that although the embodiment of FIGS. 1 through 7 comprises a unitary integral construction of a housing formed with spring members, the assembly may also be manufactured as is apparent to those skilled in the art, by the employment of mechanical springs suitably mounted, as by force fitting, bonding or the like in the apertures so as to provide a mechanical spring for the maintaining of the electrical and frictional connection between the legs of the integrated circuit packs and the corresponding upstanding wire wrap pins.

Figures 8, 9:
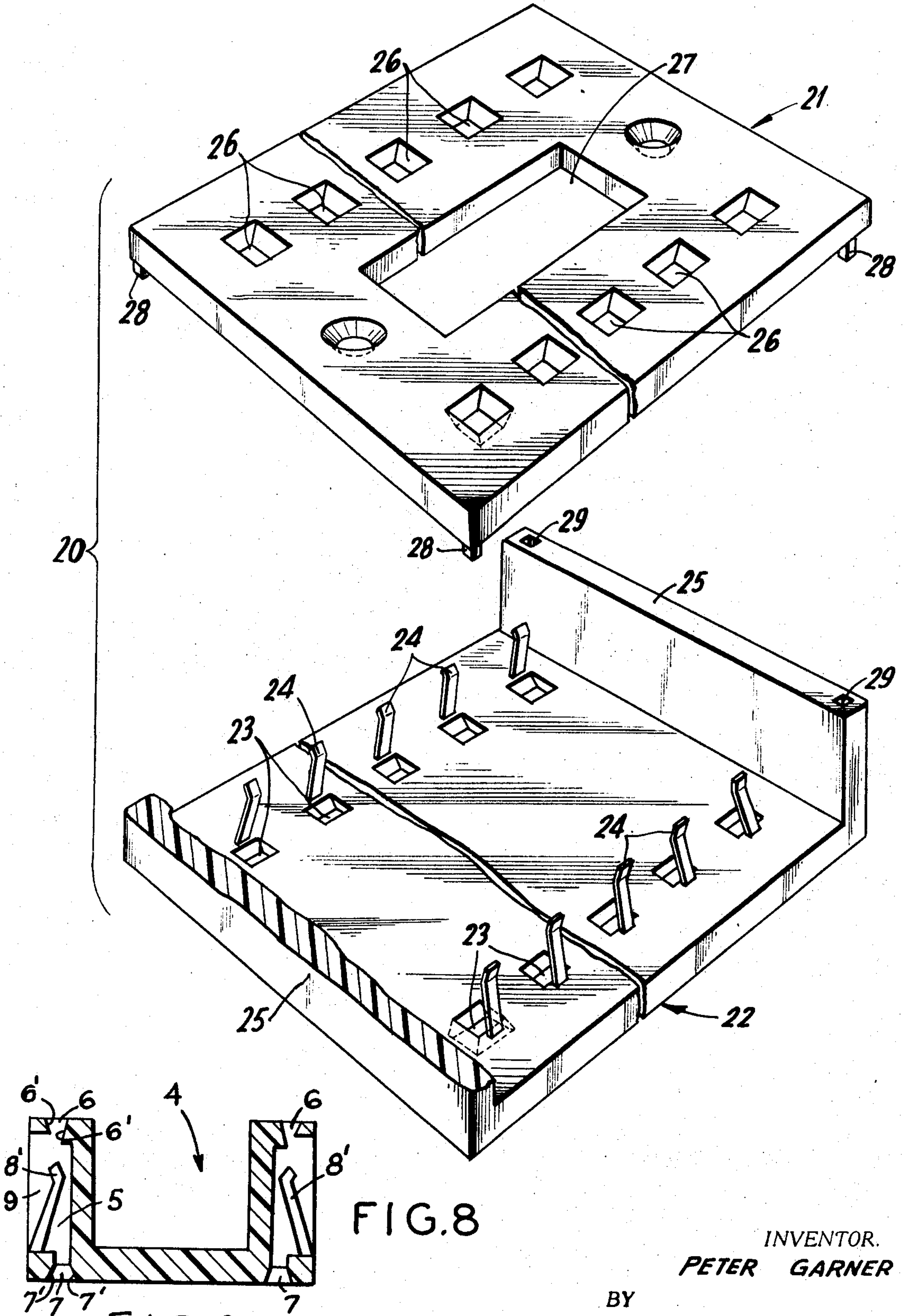
FIG. 8 illustrates an alternate embodiment of the receptacle of the present invention.
FIG. 9 illustrates a third embodiment of the receptacle of the present invention.

FIG. 8 illustrates another embodiment of the receptacle of the invention. The manufacture of the receptacle 20 is achieved by molding two cooperating assemblies 21 and 22 which are assembled prior to mounting on the wire wrap panel. The lower assembly 22 including suitable tapered openings 23, integral spring fingers 24, and walls 25, 25. The upper portion 21 of the assembly is illustrated as a planar member including tapered apertures 26, and a central opening 27 for air circulation purposes. Members 21 and 22 are aligned by use of suitable alignment projections 28 (depending from member 21) and corresponding apertures 29 disposed in the side walls 25 of the lower member. The upper and lower members may be interconnected by bonding, screw assembly and the like. It is noted that the use of a plurality of assemblies to form the receptacle may result in substantially reducing the overall cost of the receptacle.

The body member may be formed of any suitable plastic, including Norel or Lexon, as long as said plastic is nonelectrically conducting.

It is also noted that although the embodiment illustrated in FIGS. 1 through 7 comprises the configuration wherein the spring members 8 extend from the upper portion of the receptacle, it is readily apparent that the spring members may also extend from the lower portion of the body member. This configuration is illustrated in FIG. 9 which details a cross-section of a receptacle wherein the spring fingers 8' extend from the lower portion of the body member. Additionally, the spring element may be in the form of a bowed spring which extends between the upper and lower portions of the receptacle and is, in its "at rest" position, disposed partially in the intended path of the legs of the integrated circuit pack and the corresponding upstanding pins.

In summary, there has been disclosed a new and improved receptacle for mounting an integrated circuit pack to a panel having pins disposed therein. The receptacle is inexpensive, reliable, and facilitates ease of installation.

Having thus described the invention it is not intended that it be so limited as changes may be readily made therein without departing from the scope of the invention. Accordingly, it is intended that the abstract of the disclosure and the subject matter described above as shown in the drawings be interpreted as illustrative only, and not in a limiting sense.

What is claimed is:

1. A receptacle for mounting a micro-circuit pack including a plurality of leads to a panel board having a plurality of pins extending therethrough comprising:

a body member made of insulative material and including a plurality of apertures extending therethrough; said body member being generally U-shaped in cross-section with the apertures extending along the axial length of each leg portion of the U-shaped body, the arrangement of said apertures corresponding with the arrangements of the leads of the micro-circuit pack and said pins of the panel boards; and said body having integrally formed thereon a flexible spring means adjacent each aperture, said spring means partially obstructing the aperture when in its "at rest" position, with said spring means being deflected out of the path of a micro-circuit pack lead and an associated pin when disposed within said aperture whereby said deflected spring means provides a biasing force to maintain a continuous mechanical and electrical connection between said lead and pin.

2. A receptacle as in claim 1 wherein each spring means is in the form of an elongated spring finger cantilevered at one end from said body member.

3. A receptacle as in claim 1 wherein the body member is made of a plastic material.

4. A receptacle as in claim 1 wherein the spring means are cantilevered from the upper end of each leg portion of the U-shaped body member.

5. A receptacle as in claim 1 wherein each spring means is cantilevered from the lower end of each leg portion of said U-shaped body member.

* * * * *